March 18, 1969     A. R. JOHNSON     3,433,938
DATA PROCESSING APPARATUS
Filed Aug. 12, 1964     Sheet _1_ of 3
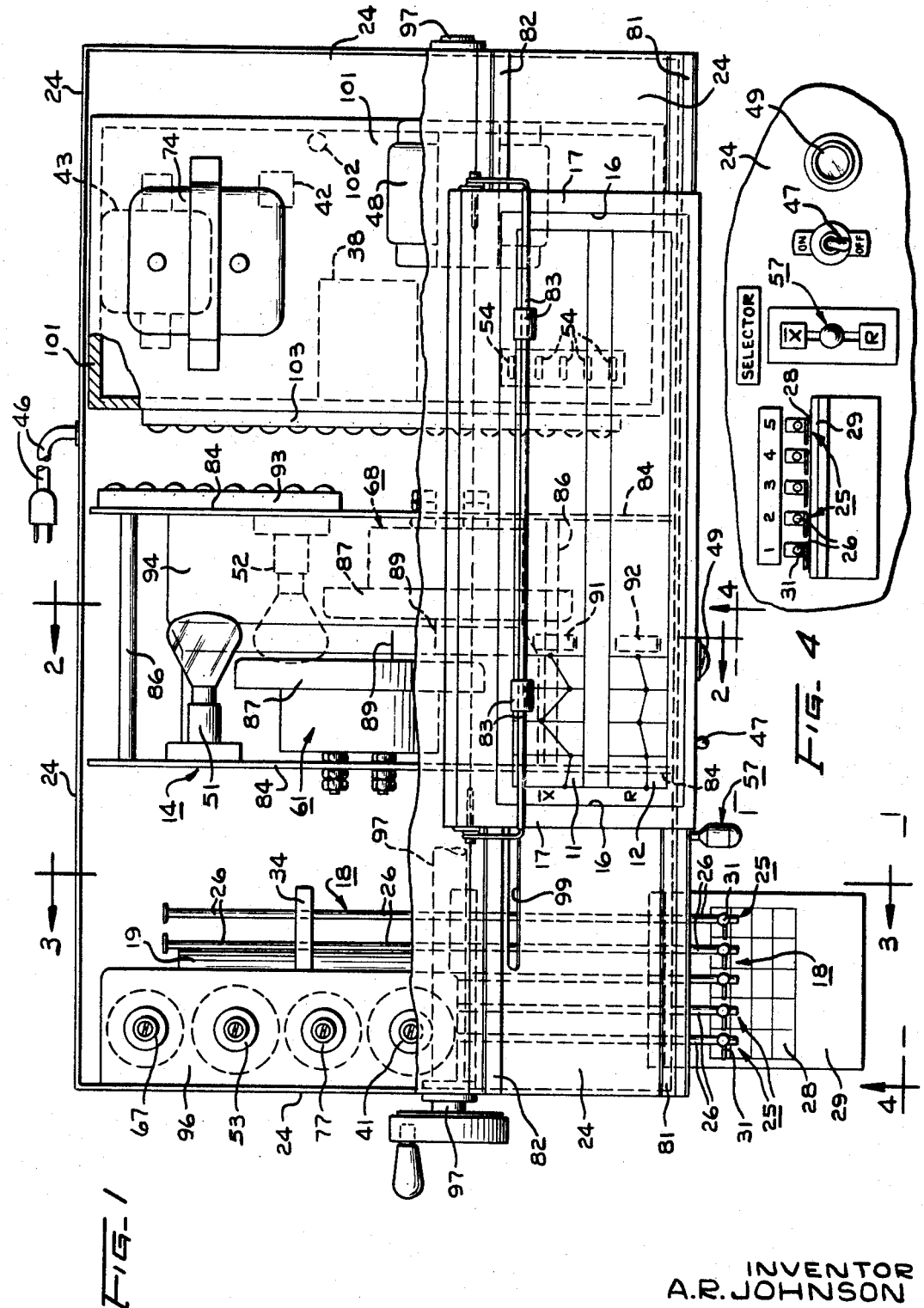
INVENTOR
A.R. JOHNSON
BY
ATTORNEY March 18, 1969 A. R. JOHNSON 3,433,938
DATA PROCESSING APPARATUS
Filed Aug. 12, 1964 Sheet 2 of 3
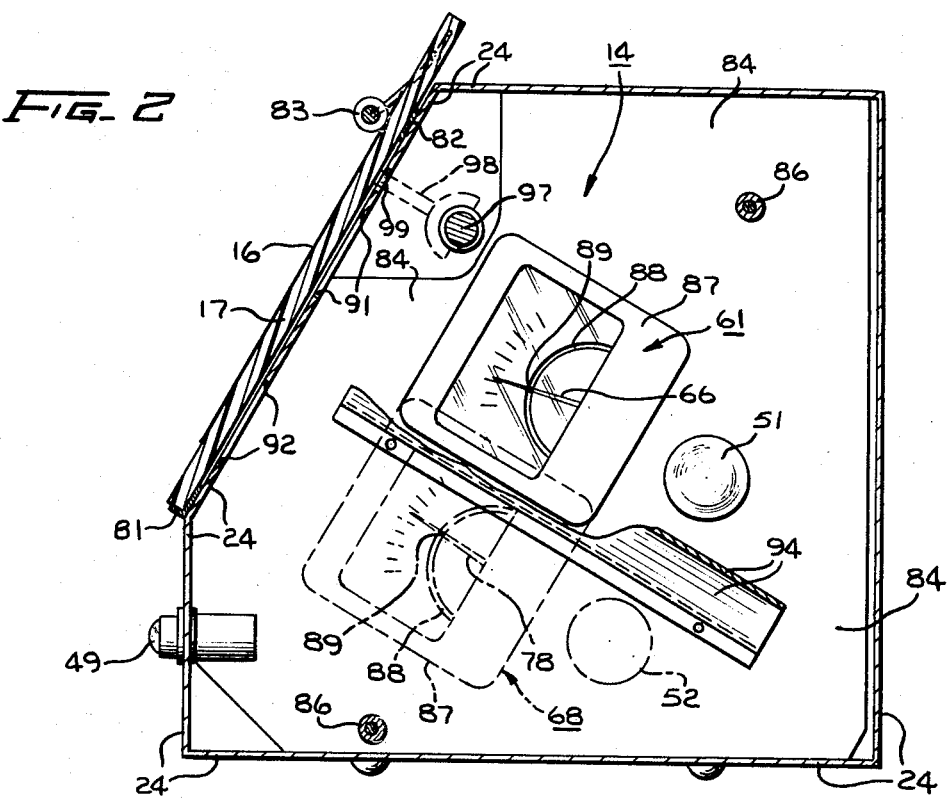
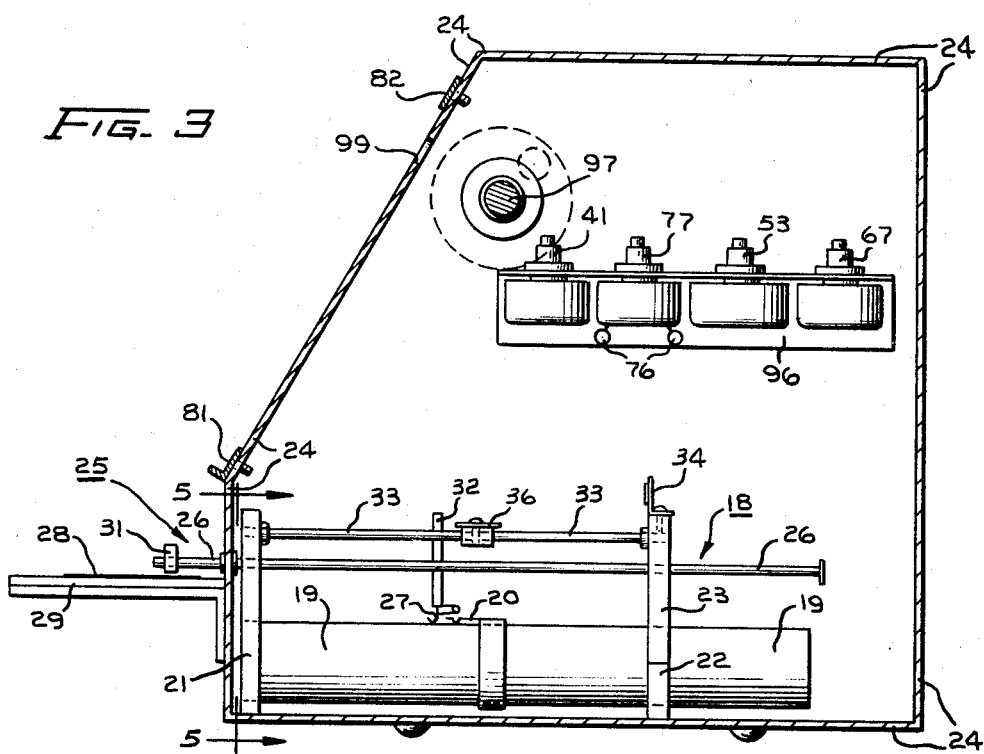

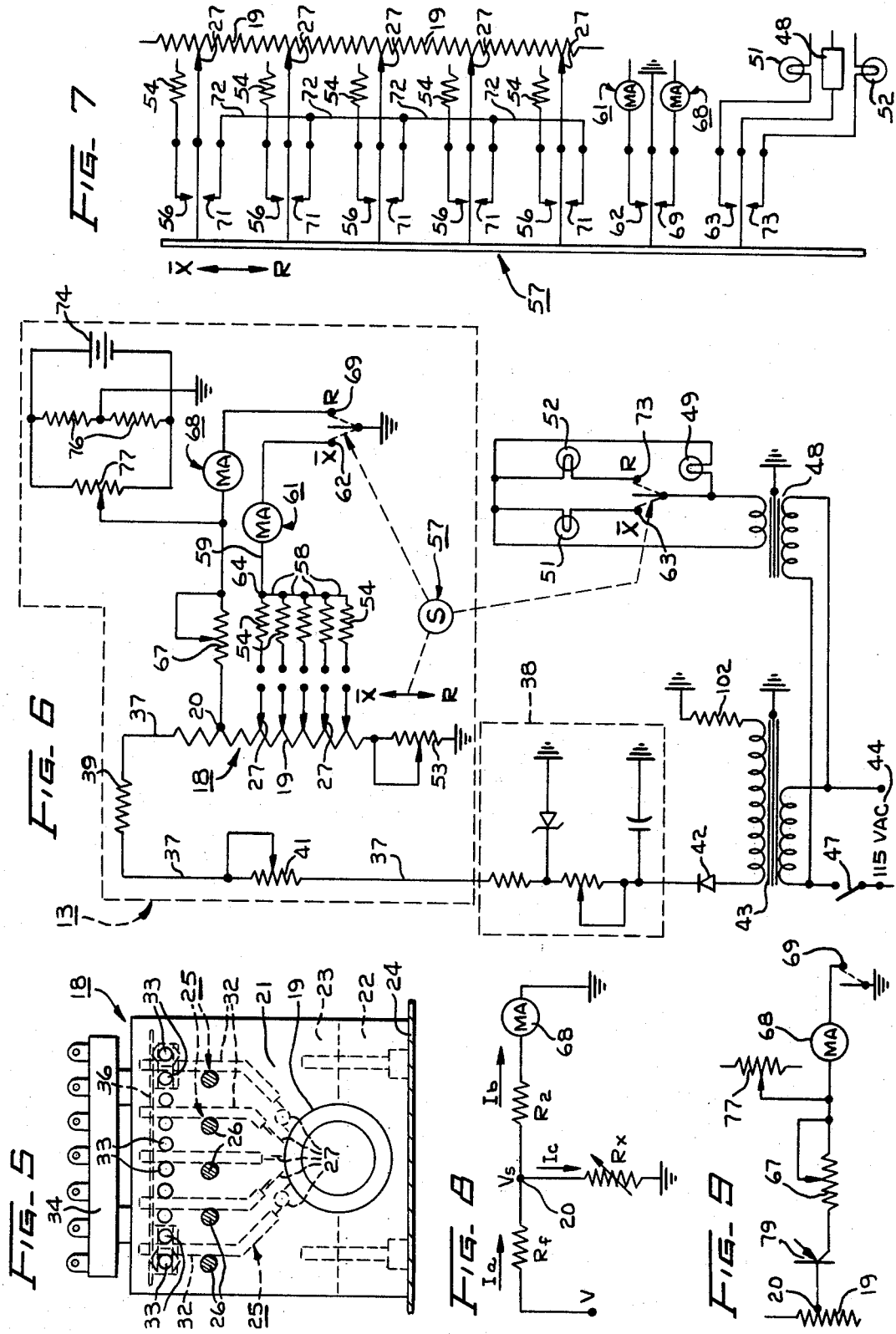

United States Patent Office 3,433,938
Patented Mar. 18, 1969

3,433,938
DATA PROCESSING APPARATUS
Arnold R. Johnson, Omaha, Nebr., assignor to Western Electric Company, Incorporated, New York, N.Y., a corporation of New York
Filed Aug. 12, 1964, Ser. No. 388,991
U.S. Cl. 235—193     15 Claims
Int. Cl. G06f 7/385

ABSTRACT OF THE DISCLOSURE

Apparatus for processing a plurality of numerical values includes a substantially constant voltage source and a resistance in circuit with the voltage source. Electrical contacts are engageable with the resistance at points thereon which are analogs of respective ones of the numerical values. Circuitry for determining the average of the numerical values includes a plurality of equal and relatively high resistances which are connectable in parallel to respective ones of the contacts and circuitry for determining the difference between the maximum and minimum numerical values includes wiring for interconnecting the contacts to short out a portion of the resistance which is an analog of the difference. A shadow projecting system is provided for automatically projecting the determined average and difference on associated charts for plotting purposes.

---

This invention relates to data processing apparatus, and more particularly to apparatus for determining a selected arithmetical characteristic of a plurality of numerical value. It is an object of this invention to provide new and improved apparatus of this character.

In numerous manufacturing operations involving one or more variables in the manufacturing process, such as the insulating of wire or the production of parts in a high speed punch press, the use of statistical quality control (SQC) is rapidly coming into extensive use for controlling the process. This type of control involves the obtaining of periodic sample data on the product being manufactured, as for example the occurrence of faults in the insulation in the case of insulated wire, or the length of the parts in the case of a punch press, on a continuous basis over a relatively long period of time. During the manufacturing process, as the sample data value are obtained, successive ones of the values are grouped into sets and certain arithmetical characteristics of each set of values, such as the arithmetical average of the values and the range or arithmetical difference between the maximum and minimum values in the set, are computed and plotted on associated statistical quality control charts. From these charts it can be determined whether the manufacturing process is behaving normally and whether correction in the process is necessary.

In the past, the computing and plotting of this statistical quality control data generally has been accomplished manually sometimes with the use of a calculator, by relatively skilled personnel. This procedure is undesirable not only because it requires the use of relatively skilled personnel, but because it is relatively time consuming, thereby making it difficult to maintain the control over the manufacturing process up to date such that immediate adjustment of the process can be made as the statistical quality control charts indicate that this is necessary. Further, where several arithmetical characteristics of the sample data are to be determined, as noted in the preceding paragraph, the use of a calculator requires feeding the data into the calculator in several separate operations to obtain the desired results.

As an alternative to the above-mentioned manual computing of the statistical quality control data, the sample data also has been processed with the use of an automatic computer. However, the purchase of such a computer solely for the purpose of statistical quality control studies generally is prohibitive from a cost standpoint because the only known prior computers capable of processing this type of information are relatively expensive, costing many thousands of dollars. In this regard, where a computer is available, it generally must be used to perform other tasks and is not available on a continuous basis for processing the sample data during the manufacturing process, which is necessary for maintaining adjustment of the process up to date as noted hereinabove. Further, the use of a computer of this type requires translating the sample data into computer language, that is, the data values must be given to a highly skilled computer operator who then feeds the problem into the computer through a relatively complicated keyboard. These computers also generally are relatively large in size, extremely sensitive to external influences, and must be operated under controlled temperature and humidity conditions, making them unsuitable for use in a factory.

Accordingly, an object of this invention is to provide new and improved data processing apparatus for computing the arithmetical average of a plurality of numerical values and the arithmetical difference between the maximum and minimum values, and for indicating the locations of the average and the difference on associated charts.

A further object of this invention is to provide new and improved apparatus for processing statistical quality control data which is simple to operate and which can be operated by relatively unskilled personnel.

A still further object of this invention is to reduce the processing time required for processing statistical quality control data.

Another object of this invention is to provide new and improved apparatus for determining a plurality of selected arithmetical characteristics of a plurality of numerical values, in which the arithmetical characteristics readily can be determined in response to a single feeding of the numerical values into the apparatus.

A further object of this invention is to provide new and improved apparatus for processing statistical quality control data which is relatively inexpensive as compared to prior known apparatus.

A still further object of this invention is to provide new and improved apparatus for processing statistical quality control data in which numerical values can be fed directly into the apparatus without the necessity for conversion to another form of data.

A still further object of this invention is to provide new and improved data processing apparatus for determining a selected arithmetical characteristic of a plurality of numerical values and for indicating the location of the characteristic on an associated chart.

Another object of this invention is to provide new and improved data processing apparatus which is relatively small and compact in nature.

A further object of this invention is to provide new and improved data processing apparatus which has relatively stable operating characteristics and which is relatively unaffected by external conditions such as temperature and humidity.

In accordance with the invention, apparatus for processing a plurality of numerical values is designed to determine a selected arithmetical characteristic of the numerical values and to indicate the location of the characteristic on an associated chart.

In a preferred embodiment of the invention, apparatus for processing a plurality of numerical values includes analog circuitry for determining the arithmetical average of the values and the range or arithmetical difference between the maximum and minimum values. A shadow projecting assembly also is provided for projecting the arithmetical average and difference onto associated charts upon which they may be plotted.

The analog circuitry includes a plurality of electrical contacts engageable with a first resistance at points which are analogs of respective ones of the numerical values. Additional equal and relatively high ohmic value resistances are connectable to respective ones of the contacts and are connectable in parallel such that the voltage potential at a point in the connecting circuitry is substantially representative of the arithmetical average of the numerical values. This point is connected to an electrical meter such that current flow through the meter deflects an arm carried thereby an amount which is substantially representative of the arithmetical average of the values.

The circuitry for determining the arithmetical difference between the maximum and minimum values includes the ence the first meter and the equal ohmic value resistances are rendered inoperative, the second meter is connected in circuit with the first resistance, and the electrical contacts are connected to one another to short out a portion of the first resistance which is an analog of the difference, whereupon the current flow through the second meter deflects an arm carried thereby an amount which is substantially representative of the difference.

The shadow projecting assembly includes a relatively opaque enclosure upon one wall of which a transparent carriage, which carries the above-mentioned charts, is movably mounted. The first and second meters are mounted in this enclosure so that the deflectable arms of the meters are located between respective light sources and chart associated with that arm, and a relatively opaque shield is mounted in the enclosure between the light sources so as to restrict the light cast from each light source to only its associated chart. Adjustable resistance means also are provided in the analog circuitry for regulating the current flow through the meters and the maximum and minimum positions of the shadow projections of the arms on their associated charts.

This invention, together with further objects and advantages thereof, will best be understood by reference to the following detailed description taken in connection with the accompanying drawings, in which:

FIG. 1 is a plan view of the apparatus with certain parts broken away and certain parts omitted;

FIG. 2 is a cross sectional view of the apparatus taken substantially along the line 2—2 of FIG. 1;

FIG. 3 is a cross sectional view of the apparatus taken substantially along the line 3—3 of FIG. 1;

FIG. 4 is a partial front elevational view of the apparatus as seen along the line 4—4 of FIG. 1;

FIG. 5 is a cross sectional view taken substantially along the line 5—5 of FIG. 3;

FIG. 6 is an electrical circuit diagram for the apparatus;

FIG. 7 is a partial electrical circuit diagram illustrating details of one of the circuit elements in the electrical circuit diagram of FIG. 6;

FIG. 8 shows a portion of the electrical circuit diagram of FIG. 6 in simplified form for the purpose of illustrating a principle of the invention; and FIG. 9 is a partial circuit diagram illustrating a modified form of the invention.

The illustrated embodiment of the invention is designed for processing sets of numerical values or data bits obtained on a product, such as an insulated wire or a piece part being manufactured in a punch press, during the manufacturing process. More particularly, referring to FIG. 1, it is seen that the apparatus is designed for the determining and the semiautomatic plotting of the arithmetical average $\overline{X}$ of the numerical values in each set, and for the determining and the semiautomatic plotting of the arithmetical difference or range R between the maximum and minimum values in each set, to provide statistical quality control $\overline{X}$ and R charts 11 and 12 for determining whether the manufacturing process is operating within established control limits.

By way of illustration, the apparatus can be positioned adjacent a punch press which is producing piece parts and in which process control is required to assure that the parts are formed to length within certain tolerances. The numerical values or data bits then could be the lengths of sample parts selected according to a specified process control plan, as for example, one part for every 2500 strokes of the punch press, with each successive group of five sample parts providing a set of numerical values for which the $\overline{X}$ and R values are to be determined. The punch press operator would measure the length of each sample part with a gage to obtain its associated numerical value, and would then feed the value into the apparatus in a manner to be described.

In the case of insulated wire, each numerical value or data bit could be the number of faults occurring in the insulation of each reel of the insulated wire on an insulating line, wherein process control is required to assure that the faults do not exist in excess of a predetermined number and frequency. In this instance, the numerical values or data bits to be fed into the apparatus and processed thereby would be obtained by the insulating line operator from a fault counter forming a part of the insulating line, with each successive group of five reels being used to provide one of the sets of numerical vlaues.

In the illustrated embodiment of the invention, the average value $\overline{X}$ and the range value R are determined by an analog circuit 13 (FIG. 6), and shadows representative of the values are projected by a shadow projecting assembly 14 (FIGS. 1 and 2) onto a piece of chart paper 16 mounted on a carriage 17 of a suitable transparent material. The $\overline{X}$ and R charts 11 and 12 are plotted on the chart paper 16 by the manufacturing process operator who marks the positions of the shadow projections of the $\overline{X}$ and R values with a pencil or other suitable marking device.

Referring to the left-hand side of FIG. 1 and to FIGS. 3, 5 and 6, it is seen that the analog circuit 13 includes a potentiometer assembly 18. As is best shown in FIG. 3, the potentiometer assembly 18 includes an elongated wire wound adjustable power resistor 19 having a tap in the form of a slide wire 20. One end of the resistor 19 is mounted in an aperture in a vertically disposed support plate member 21 (FIGS. 3 and 5) and an intermediate portion of the resistor is mounted in two vertically disposed separable plate members 22 and 23 connected together by screws, the resistor being supported in opposed semicircular cutout portions of the plate members 22 and 23. The plate members 21, 22 and 23 are of any suitable electrically nonconducting material, and the plate members 21 and 22 are removably secured to the bottom wall of a cabinet 24.

The potentiometer assembly 18 further includes a plurality of laterally spaced data input assemblies 25, each including an elongated slide rod 26 and an electrical contactor 27, for feeding the data bits into the apparatus. The number of the data input assemblies 25 provided is dependent upon the number of data bits in each set of data bits, with one assembly being required for each data bit. In this regard, while the illustrated embodiment of the invention includes five of the data input assemblies 25, and thus is capable of processing the data bits in sets of five, the apparatus could be designed with more or less of the assemblies, as necessary.

The slide rods 26 of the data input assemblies 25 are mounted adjacent their opposite ends for sliding movement in apertures in opposite ends of the resistor support plate members 21 and 23. The left-hand end portions of the slide rods 26, as viewed in FIG. 3, slidably extend through apertures in a vertical front wall of the cabinet 24 above an input scale card 28 (FIGS. 1 and 3) positioned on a horizontal shelf 29 which is cantilevered outward with respect to the cabinet and mounted on the front wall thereof. Pointer members 31 are removably mounted on the slide rods 26 so that the slide rods can be withdrawn to the right (FIG. 3) through the apertures in the front wall of the cabinet 24 to permit removal of the potentiometer assembly 18 from the cabinet. The end portions of the slide rods 26 above the input scale card 28 may be provided with apertures (not shown) for receiving the point of a pencil, which then can be used to set the slide rods and pointers 31 thereon relative to the input scale card during a data input feeding operation.

Each of the electrical contactors 27 is carried on the lower end of a vertically disposed rod member 32 (FIGS. 3 and 5) of a suitable electrically conducting material, the rod member being secured to the associated slide rod 26 and the contactor being slidably engageable with the wire wound resistor 19. The upper end of each of the vertical contact carrying rods 32 projects between a pair of laterally spaced guide rods 33 which have their opposite ends mounted in the resistor support plate members 21 and 23. A terminal strip 34 is secured to the upper end of hte resistor support plate member 23 to facilitate prewiring of the electrical contactors 27, as for example by leads (not shown) connected between the upper ends of the vertical rod members 32 and respective terminals on the strip, and to facilitate wiring of the contactors into the remainder of the circuitry of the apparatus.

In processing a set of data bits each data bit is fed into the apparatus manually by moving the slide rod 26 of one of the data input assemblies 25 to move the electrical contactor 27 on the slide rod along the wire wound resistor 19 to a point representative of, or an analog of, the magnitude of the data bit, utilizing the input scale card 28 and the pointer 31 on the slide rod for this purpose. A horizontal stop bar 36 (FIGS. 3 and 5) is adjustably mounted on the outermost ones of the guide rods 33 and is engageable by the contact carrying members 32 of the data input assemblies 25 to limit this inward feeding movement of the data input assemblies.

Referring to FIG. 6, it is seen that the wire wound resistor 19 of the analog circuit 13 is connected by leads 37 to a voltage regulator 38 through a resistance 39 and an adjustable calibrating resistance 41. The voltage regulator 38 is connected to a diode rectifier 42 which is connected to a secondary winding of a transformer 43, and a primary winding of the transformer is connectable to an A.C. voltage source 44 through an electrical cord 46 (FIG. 1) upon the closing of a toggle switch 47. The closing of the toggle switch 47, through a step-down transformer 48, also energizes a lamp circuit including an on-off indicating light 49 and a pair of light sources 51 and 52 of the shadow projecting assembly 14. The toggle switch 47 and the indicating light 49, as is shown in FIGS. 1 and 4, are mounted on the above-mentioned vertical front wall of the cabinet 24. In the alternative, power for the analog circuit 13 and the lights 49, 51 and 52 could be provided by a suitable battery, if so desired.

As is best shown in FIG. 6, a portion of the analog circuit 13 is designed for determining the average values $\overline{X}$ and includes the wire wound resistor 19, the electrical contactors 27, the resistance 39, the calibrating resistance 41, an adjustable calibrating resistance 53 connected between the wire wound resistor and ground, and a plurality of resistors 54 of equal and relatively high resistance, one of the resistors 54 being provided for each of the electrical contactors. One side of each of the resistors 54 is connected to a normally open contact 56 (FIG. 7) of a seven pole, double throw selector switch 57. The other sides of the resistors 54 are interconnected by leads 58 (FIG. 6), and the thus interconnected bank of resistors is connected by a lead 59 to one side of a D.C. milliammeter 61, the other side of the milliammeter being connected to another normally open contact 62 of the selector switch 57. To energize the average determining circuitry, the selector switch 57 is moved from a neutral position upward, as viewed in FIGS. 4, 6 or 7, to close the contacts 56 and 62, this movement of the switch also closing another normally open contact 63 thereof to energize the light source 51 of the shadow projecting assembly 14. As is shown in FIGS. 1 and 4, the selector switch 57 is suitably mounted on the vertical front wall of the cabinet 24.

The ohmic value of each of the equal resistances 54 (FIG. 6) is of a high magnitude relative to the wire wound resistor 19 so that the current through the resistances and the milliammeter 61 is small as compared to the current through the resistor, whereby the indicating circuit formed by the resistances and the milliammeter has a negligible effect on the voltage potentials at the positions at which the electrical contactors 27 are set on the resistor. Accordingly, when the slide rods 26 are adjusted to set the electrical contactors 27 at points on the resistor 19 which are analogs of their respective data bits, as above described, the voltage potential at each point is substantially representative of its associated data bit. Further, the voltage potential on the lead 59 at a point 64, while being nearly zero, is substantially representative of the average of these voltage potentials, whereby the current flow through the milliammeter 61 and the deflection of a pointer 66 (FIG. 2) of the meter is proportional to the average of the voltage potentials, and thus of the average $\overline{X}$ of the data bits. By way of illustration, in the circuit disclosed in FIG. 6, in which the maximum capacity of the milliammeter 61 is 1.0 milliamperes and the voltage regulator 38 is designed to provide 100 volts D.C., the wire wound resistor 19 has a resistance of 1000 ohms and each of the relatively high resistances 54 has a value of 47K, with the resistance 39 and the calibrating resistances 41 and 53 having values of 1.6K, 2K and 300 ohms, respectively.

To illustrate that the current flow through the milliammeter 61 is proportional to the average of the voltage potentials at the points at which the electrical contactors 27 engage the wire wound resistor 19, and thus to the average $\overline{X}$ of the data bits, by designating the voltages at the points on the resistor as $V_1$, $V_2$, $V_3$, $V_4$ and $V_5$, respectively, each of the relatively high resistances 54 as $r$, the current through each circuit branch including one of the resistances 54 as $I_1$, $I_2$, $I_3$, $I_4$ and $I_5$, respectively, the current through the milliammeter as $I_x$, and the voltage at the point 64 as $V_0$, it is seen that;

(1) $\quad V_1 - V_0 = I_1 r$
(2) $\quad V_2 - V_0 = I_2 r$
(3) $\quad V_3 - V_0 = I_3 r$
(4) $\quad V_4 - V_0 = I_4 r$
(5) $\quad V_5 - V_0 = I_5 r$ Adding Equations 1 through 5;

(6) $\quad V_1 + V_2 + V_3 + V_4 + V_5 - 5V_0 = (I_1 + I_2 + I_3 + I_4 + I_5) r$ Then, since $I_1 + I_2 + I_3 + I_4 + I_5$ equals the current flow $I_x$ through the milliammeter 61, and since $V_0$ is substantially zero, it is seen that;

(7) $\quad V_1 + V_2 + V_3 + V_4 + V_5 = I_x r$

Thus, since $r$ is a constant the current $I_x$ through the milliammeter 61 is proportional to the average value of the voltages $V_1$, $V_2$, $V_3$, $V_4$ and $V_5$, and to the average $\overline{X}$ of the data bits.

Another portion of the analog circuit 13 is designed for determining the range R between the maximum and minimum data bit values and includes the slide wire tap 20 of the resistor 19, the tap being connected through an adjustable calibrating resistance 67 to one side of a second milliammeter 68. The other side of the milliammeter 68 is connected to a normally open contact 69 of the selector switch 57. When the selector switch 57 is moved downward (FIGS. 4, 6 and 7) from its neutral inoperative position it closes the contact 69 to connect the milliammeter 68 in circuit with the slide wire tap 20 and closes normally open contacts 71 (FIG. 7) to connect the electrical contactors 27 on the slide rods 26 to one another through leads 72. At the same time, the selector switch 57 closes a normally open contact 73 thereof to energize the light source 52 of the shadow projecting assembly 14. As is shown in FIG. 6, the range determining circuitry further includes a source of D.C. voltage including a battery 74 on the order of 1½ volts, a voltage divider connected to ground and including a pair of resistances 76, and an adjustable calibrating resistance 77, the resistance 77 being connected to the same side of the milliammeter 68 as is the calibrating resistance 67.

When the electrical contactors 27 are set at points on the wire wound resistor 19 which are analogs of their respective data bits and the selector switch 57 is operated to close the contacts 71 (FIG. 7) to connect the electrical contactors 27 to one another, the portion of the resistor 19 between the maximum and minimum settings of the contactors is shorted out to change the portion of the resistor which is effective in the analog circuit 13. The resulting current flow through the milliammeter 68 is a function of the voltage drop across the variable portion of the resistor 19 and deflects a pointer 78 (FIG. 2) of the milliammeter an amount substantially proportional to the range R between the maximum and minimum data bit values.

By way of illustration, reference is made to FIG. 8 which depicts the range determining circuit in simplified form. In FIG. 8, the various terms shown, as applied to the analog circuit 13 in the preferred embodiment of the invention shown in FIG. 6, are defined as follows:

V is the fixed voltage delivered by the voltage regulator 38 and is equal to 100 volts D.C., as noted hereinabove;

$V_s$ is the voltage on the tap 20 of the wire wound resistor 19;

$R_f$ is the resistance between the voltage regulator 38 and the tap 20 and equals approximately 5000 ohms;

$R_x$ equals the sum of the variable portions of the wire wound resistor 19 (between the tap 20 and ground) and the calibrating resistance 53 and ranges from 100 to 500 ohms;

$R_2$ is the sum of the calibrating resistance 67 and the resistance of the milliammeter 68, and equals approximately 15,000 ohms; and $I_a$, $I_b$ and $I_c$ are the values of the currents in the three branches of the circuit in milliamperes.

With terms in the circuit in FIG. 8 as above defined, the circuit may be analyzed as follows:

Solving for $I_a$;

(1) $$I_a = 1000 \frac{(100 - V_s)}{R_f}$$

Substituting the ohmic value of $R_f$ in Equation 1;

(2) $$I_a = 1000 \frac{(100 - V_s)}{5,000}$$

(3) $$I_a = 20 - \frac{V_s}{5}$$

Solving for $V_s$;

(4) $$V_s = \frac{I_b R_2}{1,000}$$

Substituting the ohmic value of $R_2$ in Equation 4;

(5) $$V_s = \frac{15,000 I_b}{1,000}$$

(6) $$V_s = 15 I_b$$

From FIG. 8, it is also seen that;

(7) $$I_c = \frac{1,000 V_s}{R_x}$$

(8) $$I_b = I_a - I_c$$

Substituting in Equation 8 the values of $I_a$ and $I_c$ obtained in Equations 3 and 7, respectively;

(9) $$I_b = 20 - \frac{V_s}{5} - \frac{1,000 V_s}{R_x}$$

Substituting in Equation 9 the value of $V_s$ obtained in Equation 6;

(10) $$I_b = 20 - \frac{15 I_b}{5} - \frac{1000(15 I_b)}{R_x}$$

(11) $$I_b = 20 - 3 I_b - \frac{15,000 I_b}{R_x}$$

(12) $$4 I_b - 20 = -15,000 \frac{I_b}{R_x}$$

Solving for $R_x$;

(13) $$R_x = \frac{15,000 I_b}{4 I_b - 20}$$

(14) $$R_x = \frac{15,000 I_b}{20 - 4 I_b}$$

(15) $$R_x = \frac{750 I_b}{1 - 0.2 I_b}$$

From the foregoing analysis of the circuit in FIG. 8, it can be seen that $R_x$, which includes the variable portion the wire wound resistor 19, and $I_b$, which is the current through the milliammeter 68, are not directly proportional to one another. However, it has been found by experiment that if the calibrating resistances 67 and 77 are adjusted so that the values of $I_b$ are relatively small, as for example in the range of 0.1 to 0.5 milliampere, the error involved in substantially negligible for a current of 0.3 milliampere, and can be kept to within approximately −4% for a current of 0.1 milliampere and +4% for a current of 0.5 milliampere, without the necessity of specially calibrating the chart paper 16 for the R chart 12. For this purpose, in the illustrated embodiment of the invention each of the calibrating resistances 66 and 77 has a value of 15K.

Referring to the embodiment of the invention shown in FIG. 9, since the above-mentioned error in the range determining circuitry is due to the current flow $I_b$ in the circuit of the milliammeter 68, when relatively greater accuracy is required the error can be substantially eliminated by introducing a transistor 79 between the slide wire tap 20 and the milliammeter so that the current flow through the milliammeter is a direct function of changes in voltage at the slide wire tap. As another alternative where relatively greater accuracy is required, the milliammeter 68 could be replaced with a microammeter to reduce the current $I_b$ in the meter circuit.

As is best shown in FIGS. 1, 2 and 3, the transparent carriage 17 is supported for longitudinal movement on an inclined front wall of the cabinet 24, with the lower side of the carriage resting upon a guide 81 in the form of an elongated angle member secured to the front wall, and with the upper portion of the carriage receiving an upper guide 82 in the form of an elongated rectangular member secured to the front wall and receivable in a corresponding slot in the carriage. The chart paper 16 upon which the $\overline{X}$ and R charts 11 and 12 are to be plotted is held in place on the carriage 17 by a holder assembly 83 (FIG. 1) pivotally mounted at the opposite sides of the carriage and including suitable springs for biasing the assembly about its pivotal mounting towards the carriage.

Referring to FIGS. 1 and 2, it is seen that the shadow projecting assembly 14 includes the milliammeters 61 and 68, the meters being mounted on respective spaced and vertically disposed plate members 84. The plate members 84 are interconnected by suitable connector assemblies 86 and are removably secured to the bottom wall of the cabinet 24. Each of the milliammeters 61 and 68 includes a housing 87 having an arcuate slot 88 (FIG. 2) cut therein, and each of the milliammeter points 66 and 78 has a shadow arm 89 cemented at one end to the pointer so that the other end of the arm projects through the arcuate slot beyond the exterior of the housing, as is best shown in FIG. 1.

The first milliammeter 61 is mounted on its associated plate member 84 with its shadow arm 89 located between the light source 51 and an elongated vertical slot 91 in the inclined cabinet wall upon which the carriage 17 is mounted, so that the shadow cast by the outer free end of the shadow arm falls substantially along the longitudinal axis of the slot and thus is projected through the slot and the carriage to the $\overline{X}$ chart 11 on the chart paper 16. The second milliammeter 68 is mounted on its associated plate member 84 in a similar manner between the light source 52 and a slot 92 in the inclined cabinet wall so that the shadow cast by the outer free end of its shadow arm 89 is projected through the slot and the carriage 17 to the R chart 12. A terminal strip 93 is provided on the right-hand plate member 84, as viewed in FIG. 1, to facilitate prewiring of the shadow projecting assembly 14 and the wiring thereof into the other circuitry of the apparatus.

As indicated hereinabove, in plotting either an $\overline{X}$ or R value, the location at which the shadow of the outer free end of the associated shadow arm 89 falls on the chart paper 16 is marked by the manufacturing process operator. In this respect, since the movement of the milliammeter pointers 66 and 78, respectively, is only proportional to the average $\overline{X}$ and the range R for any one set of data bit values, true charts are obtained by providing the charts with suitable scales in a well known manner. Further, in order to avoid confusion on the part of the operator as to which of the charts 11 and 12 is being plotted at any one time and therefore the chart upon which the shadow to be marked will be found, and so that the shadow will be well defined, an opaque light reflecting shield 94 (FIGS. 1 and 2) is secured at its opposite sides to the plate members 84 between the light sources 51 and 52 so as to confine the light cast by each light source to its associated chart.

To avoid the introduction of error into the $\overline{X}$ and R charts 11 and 12 as a result of excessive arcuate movement of the milliammeter pointers 66 and 78 in the shadow projecting of the $\overline{X}$ and R values, the portion of the swing of each pointer utilized should be limited to approximately 50°, that is, as viewed in FIG. 2, 25° on either side of a line extending between its associated light source 51 or 52 and the chart paper 16 perpendicular to the plane of the chart paper. Further, as measured along this line, the spacing between the pivot point of each of the pointers 66 and 78 and its associated light source 51 or 52, respectively, the spacing of the shadow arm 89 on the pointer from the pivot point thereof, and the spacing between the shadow arm and the plane of the chart paper 16 should be on the order of 2 to 1 to 4, respectively. For example, it has been found that with the pivot of each of the pointers 66 and 78 located 2⅛ inches from the centerline of its respective light source 51 or 52 and with the shadow arm 89 on each pointer at 1 inch from its pivot point and 4 inches from the plane of the chart paper 16, errors between the shadows cast on the chart paper and the true locations of the $\overline{X}$ and R values involved are negligible even when the pointer is at the outer 25° limits of its swing.

The calibrating resistances 41, 53, 67 and 77 are utilized for regulating or calibrating the shadow projecting assembly 14 so that the shadows cost by the shadow arms 89 will not fall off of the $\overline{X}$ and R charts 11 and 12 when the data input assemblies 25 are positioned to give maximum or minimum positions of the shadows on the charts. In this sense, the calibrating potentiometers 41, 53, 67 and 77 also serve to adjust the apparatus to limit the swing of the pointers 66 and 78, as described hereinabove.

In the calibration operation, with the selector switch 57 in its "$\overline{X}$" position, all of the data input assemblies 25 are set at their minimum positions, that is, with their electrical contactors 27 adjacent the grounded end of the resistor 19, and the calibrating resistance 53 is adjusted so that the shadow cast by the shadow arm 89 of the first milliammeter 61 falls at the bottom of the $\overline{X}$ chart 11, that is, at its minimum position thereon. The data input assemblies 25 then are moved to their maximum positions and the calibrating resistance 41 is adjusted so that the shadow cast by the shadow arm 89 falls at the top of the $\overline{X}$ chart 11, or at its maximum position thereon. The foregoing steps then are repeated until the proper minimum and maximum shadow positions on the $\overline{X}$ chart 11 are achieved.

After calibrating the apparatus for the $\overline{X}$ chart 11, the selector switch 57 is moved to its "R" position and alternate ones (first, third and fifth) of the data input assemblies 25 are positioned at their minimum positions and the other data input assemblies are located at their maximum positions to give a maximum position of the shadow cast by the shadow arm 89 of the second milliammeter 68 on the R chart 12. The calibrating resistance 77 then is adjusted so that the shadow cast by the shadow arm 89 of the second milliammeter 68 falls at the top of the R chart 12. All of the data input assemblies 25 then are located in their minimum positions and the calibrating resistance 67 is adjusted so that the shadow cast by the shadow arm 89 falls at the bottom of the R chart 12, or at its minimum position thereon. These steps are repeated until maximum and minimum balance of the shadow positions is achieved on the R chart 12.

Then the calibration for the $\overline{X}$ chart 11 is rechecked by carrying out the steps above described, after which the calibration for the R chart 12 also is rechecked, these procedures being repeated until no further adjustment is necessary. As is best shown in FIGS. 1 and 3, the calibrating resistances 41, 53, 67 and 77 all are supported on a bracket 96 mounted on one of the vertical end walls of the cabinet 24, with the calibrating resistance 77 also having the resistors 76 (FIG. 3) of the voltage divider associated with the battery 74 wired thereto and supported thereon.

In the plotting of the $\overline{X}$ and R charts 11 and 12 the carriage 17 may be advanced transversely along the guide members 81 and 82, either by the operator merely pushing the carriage along the guide members, or by a suitable advancing mechanism. For example, in the illustrated embodiment of the invention the carriage 17 is designed to be advanced by an advancing screw 97 journalled adjacent its opposite ends in vertical end walls of the cabinet 24 and provided adjacent its left-hand end, as viewed in FIG. 1, with a turning crank. The advancing screw 97 is connected to the carriage 17 by a connector member 98 (best shown in FIG. 2) which at its lower end includes a semicircular screw-threaded portion engageable with the screw threads of the advancing screw. The upper end portion of the connector member 98 extends through an elongated horizontally extending slot 99 (FIGS. 1 and 2) in the inclined wall of the cabinet 24 and is removably secured to the carriage in any suitable manner.

Referring to the right-hand side of FIG. 1, it is seen than an inverted box-shaped member 101 is removably mounted in the cabinet 24 and serves as a base for numerous ones of the components of the apparatus. In this regard, the parts of the voltage regulator 38, the diode rectifier 42, the transformer 43, the bank of resistances 54 and a resistance 102 between the secondary winding of the transformer 43 and ground, all are mounted within the box-shaped member, either on the underside of a horizontal top wall or the vertical side walls thereof, while the transformer 48 and the battery 74 are mounted on the top surface of the horizontal wall. A terminal strip 103 also is mounted on one of the vertical side walls of the box-shaped member 101 to facilitate prewiring of these components and the wiring thereof to the other circuitry of the apparatus.

In operation, with the apparatus plugged into the A.C. voltage source 44 by means of an electrical cord 46 and energized by the closing of the on-off switch 47, the apparatus calibrated as above described, and the $\bar{X}$ and R charts 11 and 12 and the input scale card 28 suitably calibrated, the manufacturing process operator feeds a set of data bit values for which the average $\bar{X}$ and the range R are to be determined into the apparatus by moving respective ones of the data input assemblies 25 of the potentiometer assembly 18 relative to the wire wound resistor 19, utilizing the input scale card 28 and the pointers 31 on the slide rods 26 of the assemblies, to locate the electrical contactors 27 of the assemblies at points on the resistor which are analogs of the data bit values. The set of data bit values may be fed into the apparatus in a group, or the potentiometer assembly 18 may be utilized as a memory and each data bit value may be fed into the apparatus as it is obtained, as desired.

When a set of the data bit values has been fed into the apparatus, the selector switch 57 is moved from its neutral position to its uppermost $\bar{X}$ position (FIGS. 6 and 7) to close its contacts 56 (FIG. 7), 62 and 63, thereby connecting the relatively high resistances 54 to their respective electrical contactors 27 and energizing the first milliammeter 61 and the light source 51, respectively. The current flow through the milliammeter 61 then causes its pointer 66 to be deflected so that the shadow arm 89 on the pointer casts a shadow at a point on the $\bar{X}$ chart 11 corresponding to the arithmetical average $\bar{X}$ of the values and the operator marks the point.

The selector switch 57 next is moved to its lowermost R position (FIGS. 6 and 7) to open its contacts 56, 62 and 63, and to close its contacts 69, 71 and 73. This causes the first milliammeter 61 and the light source 51 to be de-energized, the relatively high resistances 54 to be disconnected from the electrical contactors 27, the electrical contactors to be connected to one another through the leads 72 (FIG. 7) to short out the portion of the wire wound resistor 19 between the maximum and minimum settings of the contactors thereon, and the second milliammeter 68 and its associated light source 52 to be energized. The current flow through the milliammeter 68 then causes deflection of the pointer 78 thereon so that the outer end of the shadow arm 89 on this pointer casts a shadow on the R chart 12 at a point corresponding to the range R between the maximum and minimum data bit values, and the operator marks this point.

The operator then advances the carriage 17 and the chart paper 16 thereon by turning the crank of the advancing screw 97, whereupon the next set of data bit values can be processed and plotted. In this respect, in the next plotting process the selector switch 57 is left in its lowermost range-plotting position to eliminate needless operation of the switch. In other respects, the foregoing procedure is repeated for the next set of data bit values. By processing and plotting a plurality of the sets of data bit values in this manner, the desired $\bar{X}$ and R charts 11 and 12 readily can be prepared by the manufacturing process operator as the data becomes available during the process.

While certain embodiments of the inventon have been disclosed, many modifications will be apparent and it is intended that the invention may be interpreted as including all modifications which fall within the true spirit and scope of the invention.

What is claimed is:

1. Apparatus for processing a plurality of numerical values, which comprises:
   a substantially constant voltage source;
   a resistance connected in circuit with said voltage source;
   electrical contacts engageable with said resistance at points on said resistance such that the voltage potentials on said contacts relative to ground define analog voltage signals representative of respective ones of the numerical values;
   means for determining the arithmetical average of the numerical values, said average determining means being connectable in circuit with said resistance and said electrical contacts such that the voltage potential at a point in said average determining means relative to ground is substantially equal to the average of the voltage potentials on said electrical contacts; and
   means for determining the arithmetical difference between the maximum and minimum numerical values, said difference determining means being connectable in circuit with said resistance and said electrical contacts so as to short out a portion of said resistance and thereby alter the portion of said resistance which is effectively in circuit with said voltage source by an amount which is an analog of the arithmetical difference between the maximum and minimum numerical values.

2. Apparatus for processing a plurality of numerical values, as recited in claim 1 which further comprises:
   means responsive to said averaging means for indicating the location of the arithmetical average on an associated chart; and
   means responsive to said difference determining means for indicating the location of the arithmetical difference on an associated chart.

3. Apparatus for processing a plurality of numerical values, as recited in claim 2, in which each of said indicating means projects a shadow representative of its associated determined arithmetical value on the chart associated with that value.

4. An analog computer for determining the arithmetical average of a plurality of numerical values, which comprises:
   a substantially constant voltage source;
   a first resistance connected in circuit with said voltage source;
   electrical contacts engageable with said resistance at points on said resistance such that the voltage potentials on said contacts relative to ground define analog voltage signals representative of respective ones of the numerical values;
   additional resistances of equal and relatively high ohmic value;
   means for connecting said additional resistances to respective ones of said electrical contacts;
   means, including said electrical contacts and at least a portion of said first resistance, for connecting said additional resistances in parallel, the magnitudes of said additional resistances being such that the voltage potential at a point on said connecting means is substantially equal to the average of the voltage potentials on said electrical contacts and substantially representative of the arithmetical average of the numerical values; and
   means connected to the point on said connecting means for indicating the arithmetical average of the numerical values.

5. An analog computer for determining the arithmetical average of a plurality of numerical values, as recited in claim 4, in which said first resistance is an elongated wire wound resistor and said electrical contacts are carried on laterally spaced, elongated rods slidable longitudinally and parallel to said resistor with said contacts slidably engaged with said resistor.

6. An analog computer for determining the arithmetical average of a plurality of numerical values, as recited in claim 4, in which said indicating means indicates the location of the arithmetical average of the numerical values of an associated chart.

7. An analog computer for determining the arithmetcal average of a plurality of numerical values, as recited in claim 4, in which said indicating means projects a shadow representative of the arithmetical average of the numerical values on an associated chart.

8. An analog computer for determining the arithmetical average of a plurality of numerical values, as recited in claim 4, which further comprises:
   means for rendering said indicating means and said additional resistances inoperative;
   means for connecting said electrical contacts to one another to short out a portion of said first resistance which is representative of the arithmetical difference betwen the maximum and minimum numerical values; and
   means responsive to the shorting out of the portion of said first resistance for indicating the arithmetical difference between the maximum and minimum numerical values.

9. An analog computer for determining the arithmetical difference between two numerical values which comprises:
   a substantially constant voltage source;
   a resistance connected in circuit with said voltage source;
   means for shorting out a portion of said resistance and thereby altering the portion of said resistance which is effectively in circuit with said voltage source by an amount which is an analog of the arithmetical difference between the numerical values, said shorting means including electrical contacts which are connected in circuit with said voltage source and each of which is engageable with said resistance at a point on said resistance spaced from a reference point such that the portion of said resistance between said contact and the reference point is representative of a respective one of the numerical values; and
   means for indicating the arithmetical difference between the numerical values, said indicating means being responsive to the amount of said resistance which is effectively in circuit with said voltage source as a result of said resistance being altered by said shorting means.

10. An analog computer for determining the arithmetical difference between two numerical values, as recited in claim 9, in which said shorting means further includes means for interconnecting said electrical contacts so that the portion of said resistance which is shorted out is the portion of said resistance between said contacts.

11. An analog computer for determining the arithmetical difference between two numerical values, as recited in claim 9, in which said indicating means indicates the arithmetical difference between the numerical values on an associated chart.

12. An analog computer for determining the arithmetical difference between two numerical values, as recited in claim 9, in which said indicating means projects a shadow representative of the arithmetical difference between the numerical values on an associated chart.

13. An analog computer for determining the arithmetical difference betwen two numerical values, which comprises:
   a substantially constant voltage source;
   an elongated potentiometer resistor connected in circuit with said voltage source;
   a pair of elongated rods, one for each of the numerical values and each slidable longitudinally parallel to and relative to said elongated potentiometer resistor;
   an electrical contact carried by each of said rods for movement therewith in slidable engagement with said potentiometer resistor, each of said rods being slidable so as to locate its respective contact at a point on said resistor which is an analog of the numerical value associated with said rod;
   means for connecting said electrical contacts to one another to short out the portion of said potentiometer resistor betwen said contacts; and
   means, including a tap connected to said potentiometer resistor, responsive to the shorting out of the portion of said resistor for indicating the arithmetical difference between the numerical values.

14. An analog computer for determining the arithmetical average of a plurality of numerical values and for determining the arithmetical difference between the maximum and minimum values, which comprises:
   a substantially constant voltage source;
   a first resistance connected in circuit with said voltage source;
   electrical contacts engageable with said resistance at points on said resistance such that the voltage potentials on said contacts relative to ground define analog voltage signals representative of respective ones of the numerical values;
   a movably mounted carriage;
   first and second light sources mounted in spaced relationship with respect to said carriage;
   first and second electrical meters, each of said meters having a movable arm located between a respective one of said light sources and said carriage such that the shadow of at least a portion of said arm is projected onto an associated chart on said carriage;
   additional resistances of equal and relatively high ohmic value;
   means for connecting said adidtional resistances to respective ones of said electrical contacts;
   means, including said electrical contacts and at least a portion of said first resistance, for connecting said additional resistances in parallel, the magnitudes of said additional resistances being such that the voltage potential at a point on said connecting means is substantially equal to the average of the voltage potentials on said electrical contacts and substantially representative of the arithmetical average of the numerical values;
   means for rendering said second meter inoperative and for connecting said first meter in circuit with the point on said connecting means such that the current flow through said first meter deflects the arm carried by said first meter and the shadow of the arm projected on the associated chart on said carriage is substantially representative of the arithmetical average of the numerical values;
   means for rendering said first meter and said additional resistances inoperative;
   means for connecting said electrical contacts to one another to short out a portion of said first resistance which is representative of the arithmetical difference betwen the maximum and minimum numerical values;
   means for connecting said second meter in circuit with said first resistance when said first meter and said additional resistances are inoperative and said electrical contacts are connected to one another, such that the current flow through said second meter deflects the arm carried by said second meter and the shadow of the arm projected on the associated chart on said carriage is substantially representative of the arithmetical difference betwen the maximum and minimum numerical values.

15. An analog computer for determining the arithmetical average of a plurality of numerical values and for determining the arithmetical difference between the maximum and minimum values, which comprises:

a substantially constant voltage source;

an elongated potentiometer resistor connected to said voltage source;

a plurality of elongated rods, one for each of the numerical values and each slidable longitudinally parallel to and relative to said potentiometer resistor;

an electrical contact carried by each of said rods for movement therewith in slidable engagement with said potentiometer resistor between minimum and maximum positions thereon, each of said rods being slidable so as to locate its respective contact at a point on said resistor which is an analog of the numerical value associated with said rod;

a relatively opaque enclosure;

a carriage of transparent material movably mounted on a wall of said enclosure;

first and second light sources mounted in said enclosure in spaced relationship with respect to the wall thereof and said carriage;

first and second electrical meters, each of said meters having a movable arm located in said enclosure between a respective one of said light sources and said carriage such that the shadow of at least a portion of said arm is projected through a slot in the wall of said enclosure onto said carriage and an associated chart on said carriage;

an opaque light reflecting shield mounted in said enclosure between said light sources so as to restrict the light cast from each light source to its associated chart on said carriage;

a plurality of resistances of equal and relatively high ohmic value;

means for connecting said resistances to respective ones of said electrical contacts on said slidable rods;

means, including said electricals contacts and at least a portion of said potentiometer resistor, for connecting said additional resistances in parallel, the magnitudes of said additional resistances being such that the voltage potential at a point on said connecting means is substantially representative of the arithmetical average of the numerical values;

means for rendering said second meter inoperative and for connecting said first meter in circuit with the point on said connecting means such that the current flow through said first meter deflects the arm carried by said first meter and the shadow of the arm projected on the associated chart on said carriage is substantially representative of the arithmetical average of the numerical values;

means for rendering said first meter and said additional resistances inoperative;

means for connecting said electrical contacts to one another to short out a portion of said potentiometer resistor which is representative of the arithmetical difference between the maximum and minimum numerical values;

means for connecting said second meter in circuit with said potentiometer resistor when said first meter and said additional resistances are inoperative and said electrical contacts are connected to one another, such that the current flow through said second meter deflects the arm carried by said second meter and the shadow of the arm projected on the associated chart on said carriage is substantially representative of the arithmetical difference between the maximum and minimum numerical values;

separate adjustable resistance means for varying the curent flow through said first meter, to control the position of the arm of said first meter and the shadow projection of the arm on its associated chart on said carriage when said electrical contacts all are in their minimum value positions and their maximum value positions, respectively;

a direct current voltage source connected to said second meter; and separate adjustable resistance means for varying the current flow through said first meter, to control the the position of the arm of said second meter and the shadow projection of the arm on its associated chart on said carriage when said electrical contacts are positioned to give maximum and minimum positions of the shadow projection of the arm, respectively, the adjustable resistance means associated with the maximum position of the shadow projection of the arm being connected between said second meter and said direct current voltage source.

References Cited

UNITED STATES PATENTS 2,245,970  6/1941  Frantz.
2,767,914  10/1956  Merrill et al. _____235—151.13
2,238,532  3/1966  Michel et al. ____ __235—179 X MALCOLM A. MORRISON, *Primary Examiner.*

FELIX D. GRUBER, *Assistant Examiner.*

U.S. Cl. X.R.

235—151.13, 179, 184

PO-1050
(5/69)

UNITED STATES PATENT OFFICE
CERTIFICATE OF CORRECTION

Patent No. 3,433,938                    Dated   March 18, 1969

Inventor(s)    Arnold R. Johnson

It is certified that error appears in the above-identified patent and that said Letters Patent are hereby corrected as shown below:

Column 1, in each of lines 34 and 48, "value" should be --values--. Column 3, line 21, cancel "ence" and insert --above-mentioned electrical contacts and first resistance, and a second electrical meter. In determining the difference--; cancel lines 34 through 37 and insert --the meters are located between respective light sources and the carriage, whereby the shadow of at least a portion of each arm is projected through a slot in the wall of the enclosure and through the transparent carriage onto the--; cancel lines 55 and 56. Column 5, line 30, "hte" should be --the--. Column 8, line 25, the part of the equation reading "15,000I$_b$" should be preceded by a minus (-) sign; line 47, "66" should be --67--. Column 10, line 1. "cost" should be --cast--. Column 14, in each of lines 13 and 64, "betwen" should be --between--. Column 16, line 19, "curent" should be --current--; line 28, "first" should be --second--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents